US008804583B2

(12) United States Patent
Aggarwal et al.

(10) Patent No.: US 8,804,583 B2
(45) Date of Patent: Aug. 12, 2014

(54) SYSTEM AND METHOD FOR MEDIUM ACCESS CONTROL ENABLING BOTH FULL-DUPLEX AND HALF-DUPLEX COMMUNICATIONS

(75) Inventors: Vaneet Aggarwal, Parsippany, NJ (US); Rittwik Jana, Parsippany, NJ (US); Christopher W. Rice, Parsippany, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 203 days.

(21) Appl. No.: 13/549,214

(22) Filed: Jul. 13, 2012

(65) Prior Publication Data

US 2014/0016516 A1 Jan. 16, 2014

(51) Int. Cl.
*H04L 5/16* (2006.01)
*H04B 3/20* (2006.01)

(52) U.S. Cl.
USPC ............................ 370/296; 370/279; 370/286

(58) Field of Classification Search
CPC ......... H04L 5/14; H04L 5/16; H04W 28/048; H04W 52/0238; H04W 52/243; H04B 1/10; H04B 7/02; H04B 15/00; H04B 2001/10; H04B 2215/00
USPC .......................... 370/277, 278, 282, 286, 296
See application file for complete search history.

(56) References Cited

U.S. PATENT DOCUMENTS

| | | | |
|---|---|---|---|
| 8,462,671 B2 * | 6/2013 | Rinne et al. .................. | 370/278 |
| 2006/0149963 A1 * | 7/2006 | Lu et al. ....................... | 713/151 |
| 2008/0112517 A1 | 5/2008 | Parts et al. | |
| 2011/0182216 A1 * | 7/2011 | Ono et al. ..................... | 370/282 |
| 2012/0147790 A1 | 6/2012 | Khojastepour et al. | |
| 2012/0155336 A1 | 6/2012 | Khojastepour et al. | |
| 2012/0201153 A1 | 8/2012 | Bharadia et al. | |
| 2013/0188760 A1 | 7/2013 | Subramanian et al. | |
| 2013/0215805 A1 | 8/2013 | Hong et al. | |
| 2013/0223294 A1 * | 8/2013 | Karjalainen et al. .......... | 370/277 |
| 2013/0244720 A1 | 9/2013 | Hsia et al. | |
| 2013/0250866 A1 * | 9/2013 | Hui et al. ...................... | 370/329 |
| 2013/0301487 A1 | 11/2013 | Khandani | |
| 2014/0016515 A1 | 1/2014 | Jana et al. | |
| 2014/0016516 A1 * | 1/2014 | Aggarwal et al. ............. | 370/278 |

OTHER PUBLICATIONS

Everett et al., "Empowering full-duplex wireless communication by exploiting directional diversity," Conference Record of the Forty Fifth Asilomar Conference on Signals, Systems and Computers (ASILOMAR), 2011, Nov. 6-9, 2011, pp. 2002-2006; ISBN; 978-1-4673-0321-7.

\* cited by examiner

Primary Examiner — Benjamin H Elliott, IV

(57) ABSTRACT

Disclosed herein are systems, methods, and non-transitory computer-readable storage media for a modified MAC protocol which can facilitate communications with both full-duplex and half-duplex devices. A system configured according to the disclosed method can enable communications between an Access Point (AP) and a client in either full duplex or half duplex. The system can similarly enable peer-to-peer communications in both full duplex and half duplex communication modes.

20 Claims, 7 Drawing Sheets

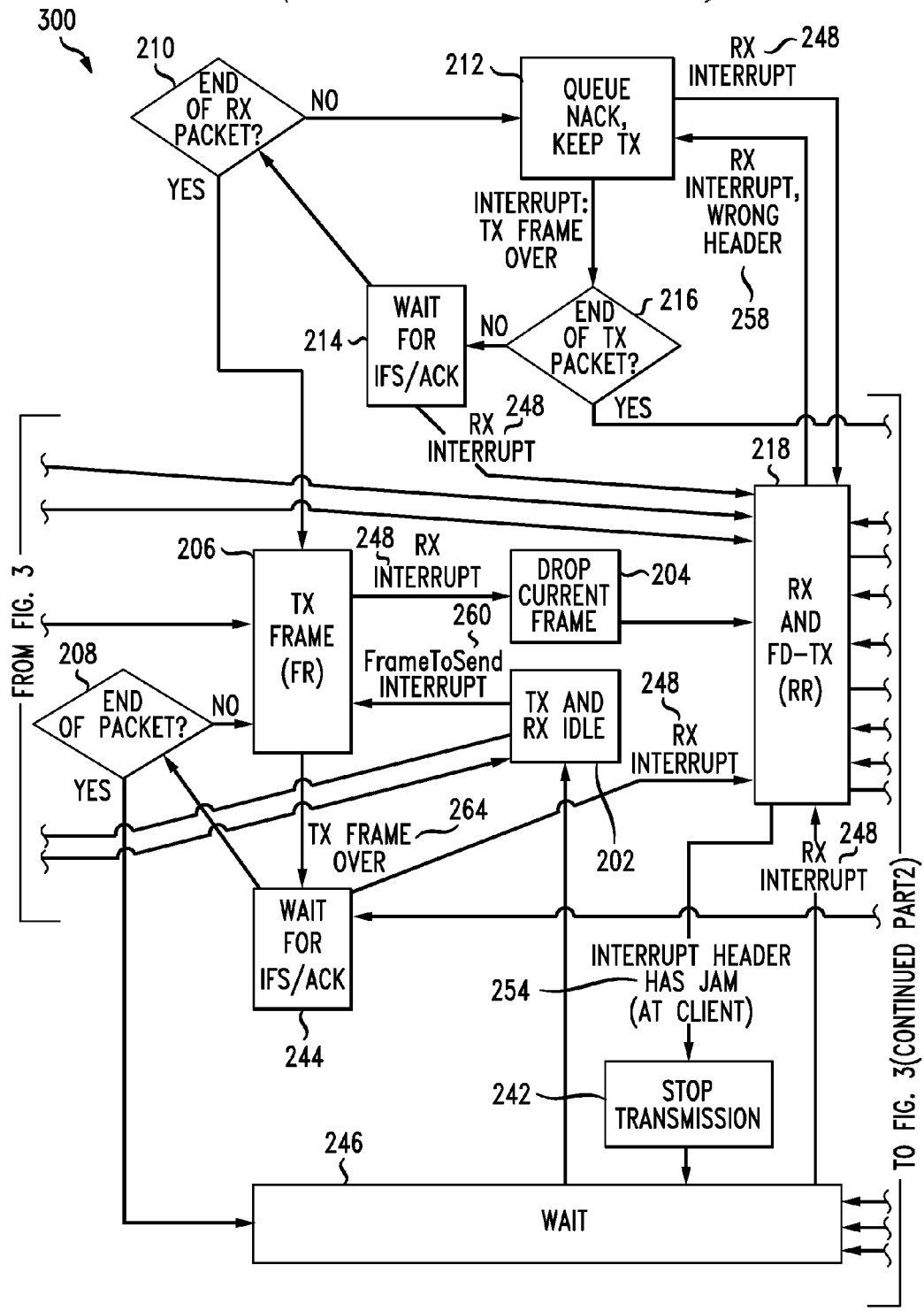
FIG. 3(CONTINUED PART 1)

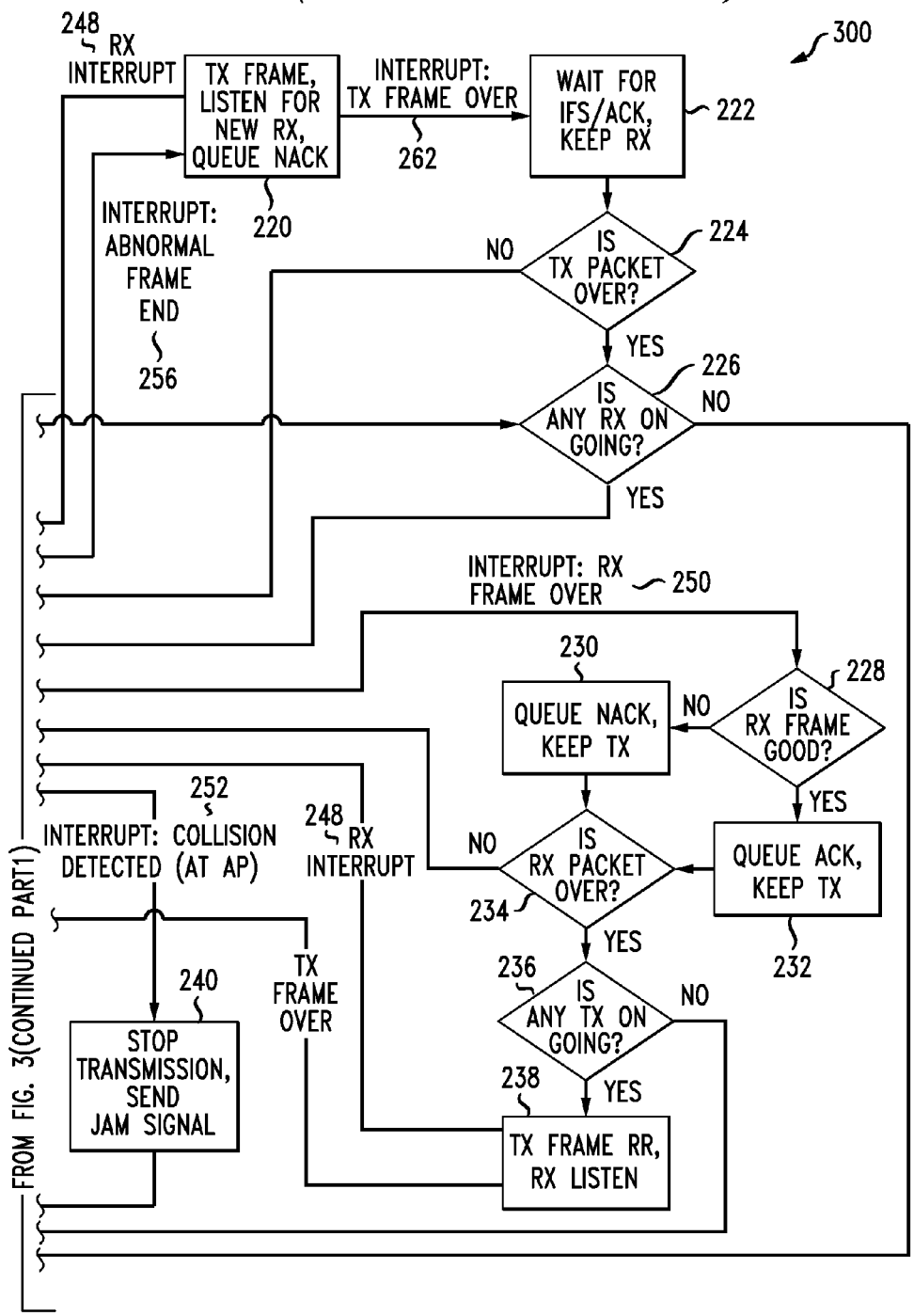
FIG. 3 (CONTINUED PART 2)

SYSTEM AND METHOD FOR MEDIUM ACCESS CONTROL ENABLING BOTH FULL-DUPLEX AND HALF-DUPLEX COMMUNICATIONS

CROSS-REFERENCE

The present application is related to U.S. patent application Ser. No. 13/549,189, filed on Jul. 13, 2012, the contents of which are incorporated herein by reference in its entirety.

BACKGROUND

1. Technical Field

The present disclosure relates to full duplex communications and more specifically to providing compatibility of full duplex communication devices and systems with existing half duplex devices and systems.

2. Introduction

Current wireless communications systems cannot transmit and receive on the same frequency at the same time, i.e., these networks do not operate in a full-duplex fashion. As a result, such networks are either time-division duplex (e.g., WiFi) or frequency-division duplex (e.g., cellular). A challenge in achieving full-duplex communication is a large power differential between the "self-interference" created by a node's own radio transmission and the signal of interest. This large power differential exists because the self-interference signal has to travel much shorter distances compared to the signal of interest. The large power differential swamps the signal of interest due to finite resolution of analog-to-digital conversion.

Previous efforts to suppress self-interference have reported success for only very short range line-of-sight (LOS) channels like those encountered in personal area networks such as Bluetooth and Zigbee. Such small range abilities continue to remain a bottleneck for including full-duplex in practical wireless networks. By overcoming the limitations associated with previous systems, full-duplex communications can extend communication range while increasing bandwidth.

However, initial introduction of full-duplex communications requires coexistence with regular, half duplex communication systems. To take full advantage of full duplex communications while continuing to comply with existing half duplex communications, the Medium Access Control (MAC) protocol which regulates access to the shared medium requires modification. MAC protocols can help decide when a node accesses a shared medium, resolve potential conflicts between competing nodes, correct communication errors, and control the flow of network traffic.

DETAILED DESCRIPTION

Disclosed are systems, methods, and non-transitory computer-readable storage media for a modified MAC protocol which can facilitate communications with both full-duplex and half-duplex devices. A system configured according to the disclosed method can enable communications between an Access Point (AP) and a client in either full duplex or half duplex. The system can similarly enable peer-to-peer communications in both full duplex and half duplex communication modes.

As an example, consider two full duplex capable nodes seeking to converge upon a mode where both nodes are transmitting and receiving simultaneously. A first node begin transmitting at a higher rate, then upon receiving a communication from the second node the first node immediately drops the current frame while reducing the communication rate to a reduced rate. While ideally both nodes could transmit at a full rate simultaneously in the same spectrum, due to imperfect cancellation of self-interference, full duplex communications can require a reduced rate. By dropping the current frame and immediately switching to a reduce rate, the system can avoid the signaling and 'hand-shaking' otherwise required. This improves the step down time required to shift from a high data rate to a reduced rate.

In addition, each full duplex node can train its receiving path for self-interference cancellation at all times. Because self-interference cancellation is done in the receiving path only when transmitting, this avoids the need for a two-way signaling mechanism to turn training on and off. The overhead due to extra training is comparatively less than signaling-based training involving multiple nodes. Various embodiments of the disclosure are described in detail below. While specific implementations are described, it should be understood that this is done for illustration purposes only. A person skilled in the relevant art will recognize that other components and configurations may be used without parting from the scope of the disclosure.

Figure 1:
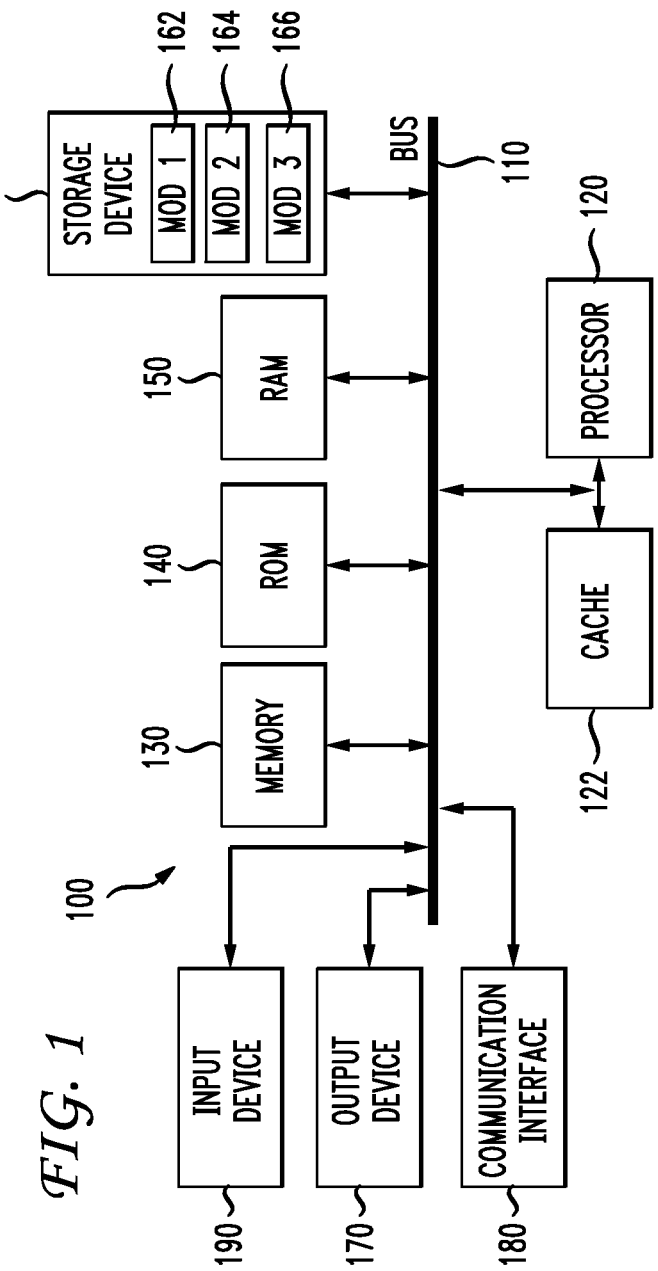
FIG. 1 illustrates an example system embodiment.

FIG. 1. illustrates a basic general purpose system or computing device in FIG. 1 which can be employed to practice the concepts is disclosed herein. A more detailed description of an improved MAC protocol will then follow, accompanied by various examples and embodiments. With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 (MOD 1) 162, module 2 (MOD 2) 164, and module 3 (MOD 3) 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components may vary depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
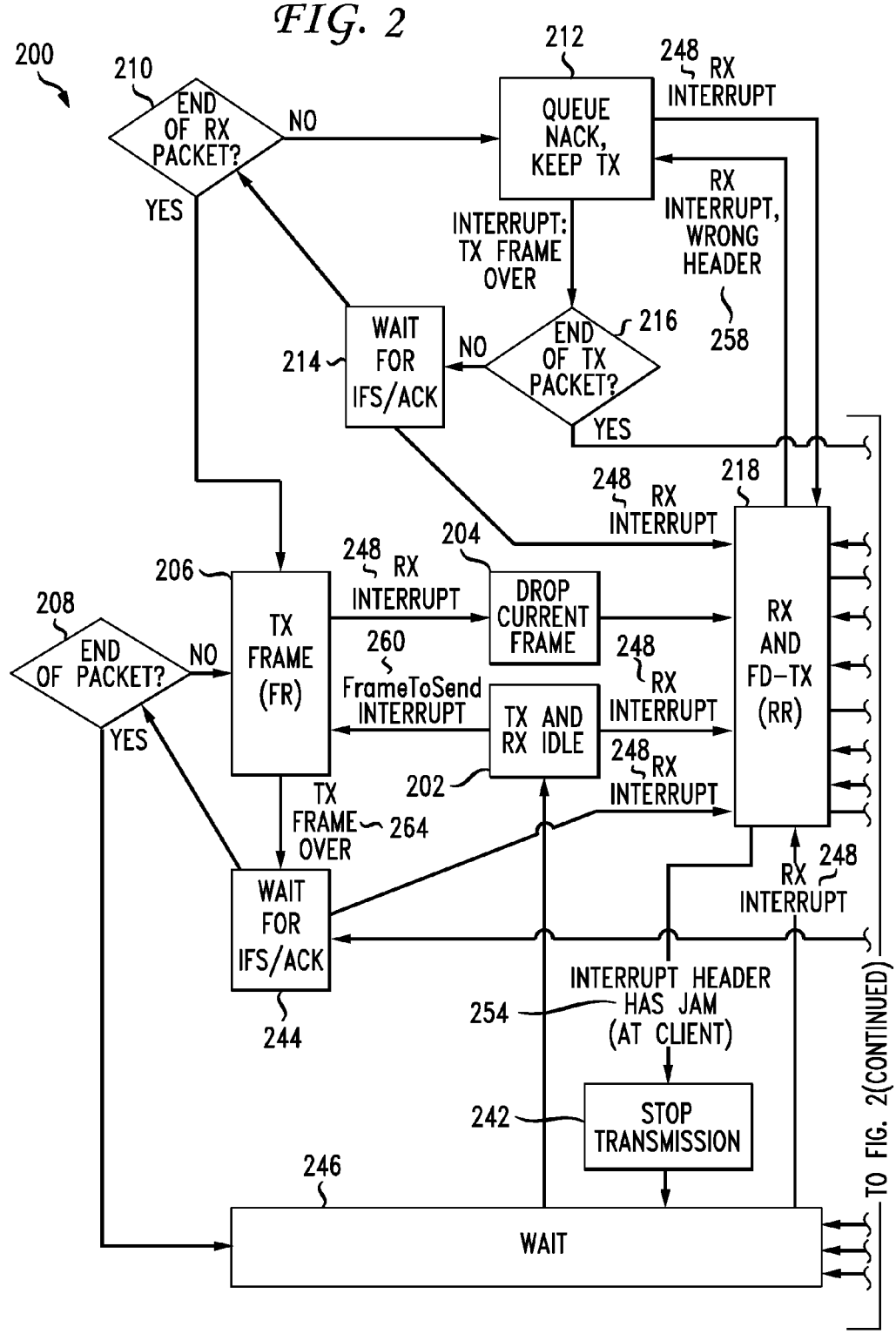
FIG. 2 illustrates an example of a MAC protocol where all nodes are full duplex.
Figure 2:
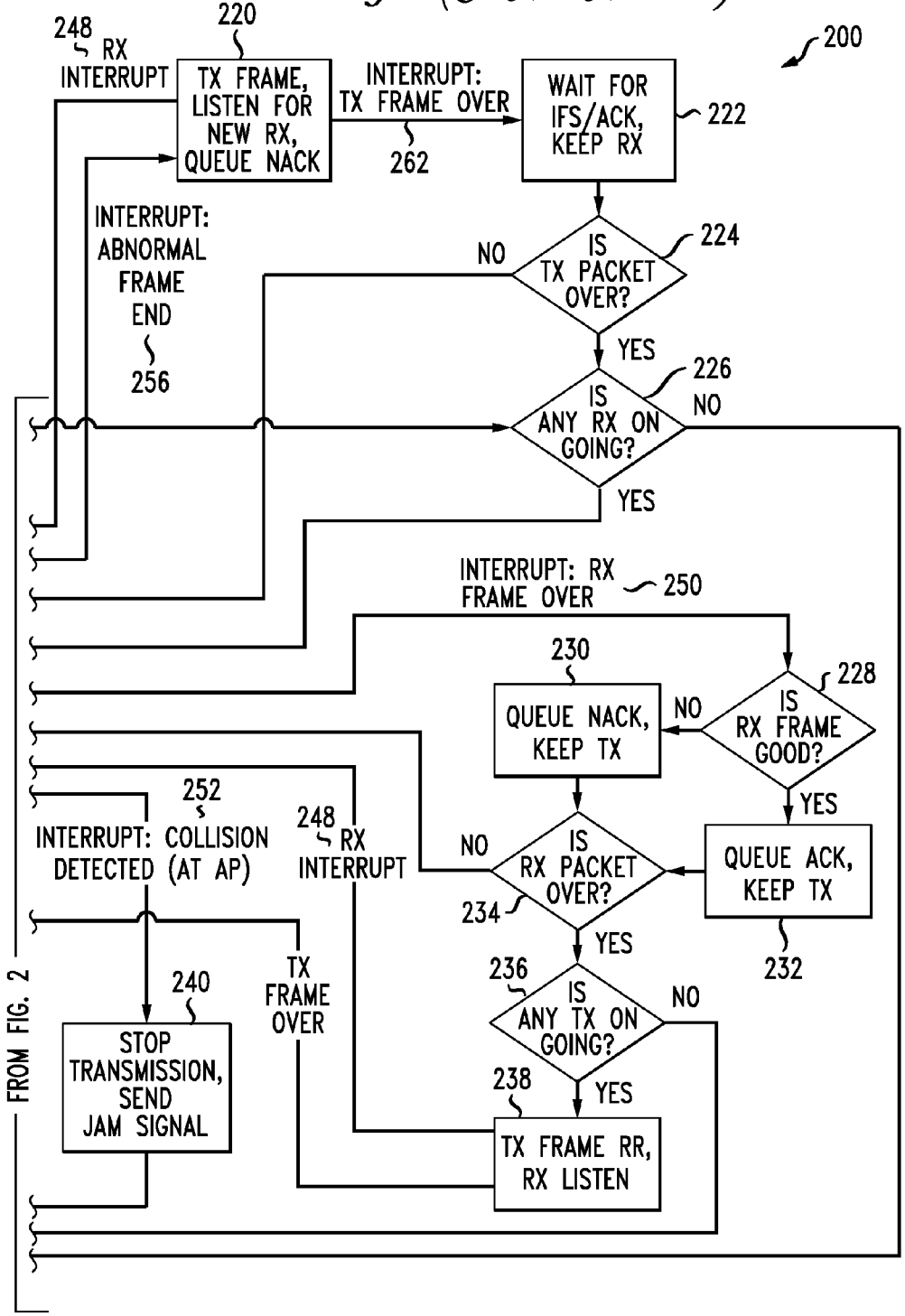

Having disclosed some components of a computing system, the disclosure now turns to FIG. 2, which illustrates an example of an improved MAC protocol 200 for full duplex nodes communicating only with other full duplex nodes. Nodes, as described herein, can be communication points. These communication points can be terminal nodes, such as a laptop or a server, or alternatively, they can be relay nodes, such as wireless routers. As illustrated, the protocol 200 illustrates the protocols of a single node in the communication link. Each node in a full duplex communication link, whether transmitting, receiving, or both, would follow a similar protocol.

In this example, the node starts in a 'TX and RX Idle' 202 state, where it waits for either an 'RX Interrupt' 248 or data to transmit. Where the node receives data to transmit, as indicated by a 'Frame to Send Interrupt' 260, and has not received an 'RX Interrupt' 248, the protocol shifts from 'TX and RX Idle' 202 to the 'TX Frame (FR)' 206. In this mode the node operates following WLAN design, transmitting at a high rate or full rate. The node transmits the signal 264, then 'Waits for IFS/ACK' 244. Upon receiving acknowledgement of the transmitted communication, the protocol determines if the signal needs to continue to transmit via the 'End of the packet' 208 state. If so, the protocol goes to a 'Wait' 246 state, whereas if not the protocol continues to transmit 206 and wait for acknowledgement 244. If the node, while in the 'TX Frame (FR)' 206 state, receives an 'RX Interrupt' 248, the protocol drops the current frame ('Drop Current Frame' 204) and proceeds to 'RX and FD-TX (RR)' 218.

The node detects an 'RX Interrupt' 248 upon receiving energy at the Rx antenna associated with the node. When an 'RX Interrupt' 248 is detected, at any point in the protocol, the protocol immediately jumps to 'RX and FD-TX (RR)' 218, which represents receiving and full duplex transmitting at a reduced rate. This immediate transition can and will often result in dropping a current frame if it has not finished being transmitted.

When a protocol operating in the 'RX and FD-TX (RR)' 218 state receives an interrupt indicating an incorrect frame header 258, the protocol can 'Queue NACK, Keep TX' 212, which indicates that a negative acknowledgement is placed in the queue of data to be transmitted to the other node. Upon transmitting this negative acknowledgement, the protocol determines if additional data needs to be transmitted to communicate the incorrect header ('End of TX packet?' 216). If so, the protocol 'Waits for IFS/ACK' 214, then determines if additional information is being received ('End of RX packet?' 210), and cycles into either continuing to queue and send NACK ('Queue NACK, Keep TX' 212) or moving into a transmit only mode at a full rate ('TX frame (FR)' 206). If no additional data needs to be transmitted to communicate the incorrect header ('End of TX packet?' 216) the protocol determines if there is ongoing receiving ('Is any RX ongoing?' 226). If not, the protocol goes into 'Wait' 246 mode, then cycles into 'TX and RX idle' 202. Otherwise the protocol proceeds to continue receiving and transmitting at a reduced rate ('RX and FD-TX (RR)' 218).

When a protocol operating in the 'RX and FD-TX (RR)' 218 state receives an interrupt indicating Abnormal Frame End 256, the protocol continues to transmit and receive new data while queuing a NACK to be transmitted ('TX Frame, listen for new RX, Queue NACK' 220). The protocol then transmits the NACK 262, waits for IFS/ACK while continuing to receive ('Wait for IFS/ACK, Keep RX' 222), then determines if the transmissions are continuing ('Is TX Packet Over?' 224). If not, the protocol goes to RX and FD-TX (RR)' 218; however, if the transmissions continue then the protocol determines if there is ongoing receiving ('Is any RX ongoing?' 226). If not, the protocol goes into 'Wait' 246 mode, then cycles into 'TX and RX idle' 202. Otherwise the protocol proceeds to continue receiving and transmitting at a reduced rate ('RX and FD-TX (RR)' 218).

Where a protocol operating in the 'RX and FD-TX (RR)' 218 state receives an interrupt indicating that the RX frame is over 250, the protocol determines if the received frame is good ('Is RX frame good?' 228). If so, the protocol queues an ACK while continuing to transmit ('Queue ACK, Keep TX' 232). If not, the protocol queues a NACK while continuing to transmit ('Queue NACK, Keep TX' 230). When the received packet is incomplete ('Is RX packet over' 234), the protocol can return to 'RX and FD-TX (RR)' 218 or, when there is no additionally received data, determine if there are continuing transmissions ('Is any TX ongoing?' 236). If not, the protocol goes into 'Wait' 246 mode, then cycles into 'TX and RX idle' 202. If there are continuing transmissions, they are transmitted at a reduced rate while listening for newly received data ('TX frame RR, RX listen' 238). At this point the protocol can return to a transmit only mode ('Tx Frame (FR)' 206, via 'Wait for IFS/ACK' 244 and 'End of Packet?' 208).

Where a protocol operating in the 'RX and FD-TX (RR)' 218 state receives an interrupt indicating a header jam at a client 254, the protocol stops the current transmission 242, then the protocol goes into 'Wait' 246 mode, then cycles into 'TX and RX idle' 202. Where the protocol operating in the 'RX and FD-TX (RR)' 218 state receives an interrupt indicating collision 252 from multiple clients sending data, it stops transmission and sends jam signal 240, then the protocol goes into 'Wait' 246 mode, then cycles into 'TX and RX idle' 202.

Figure 3:
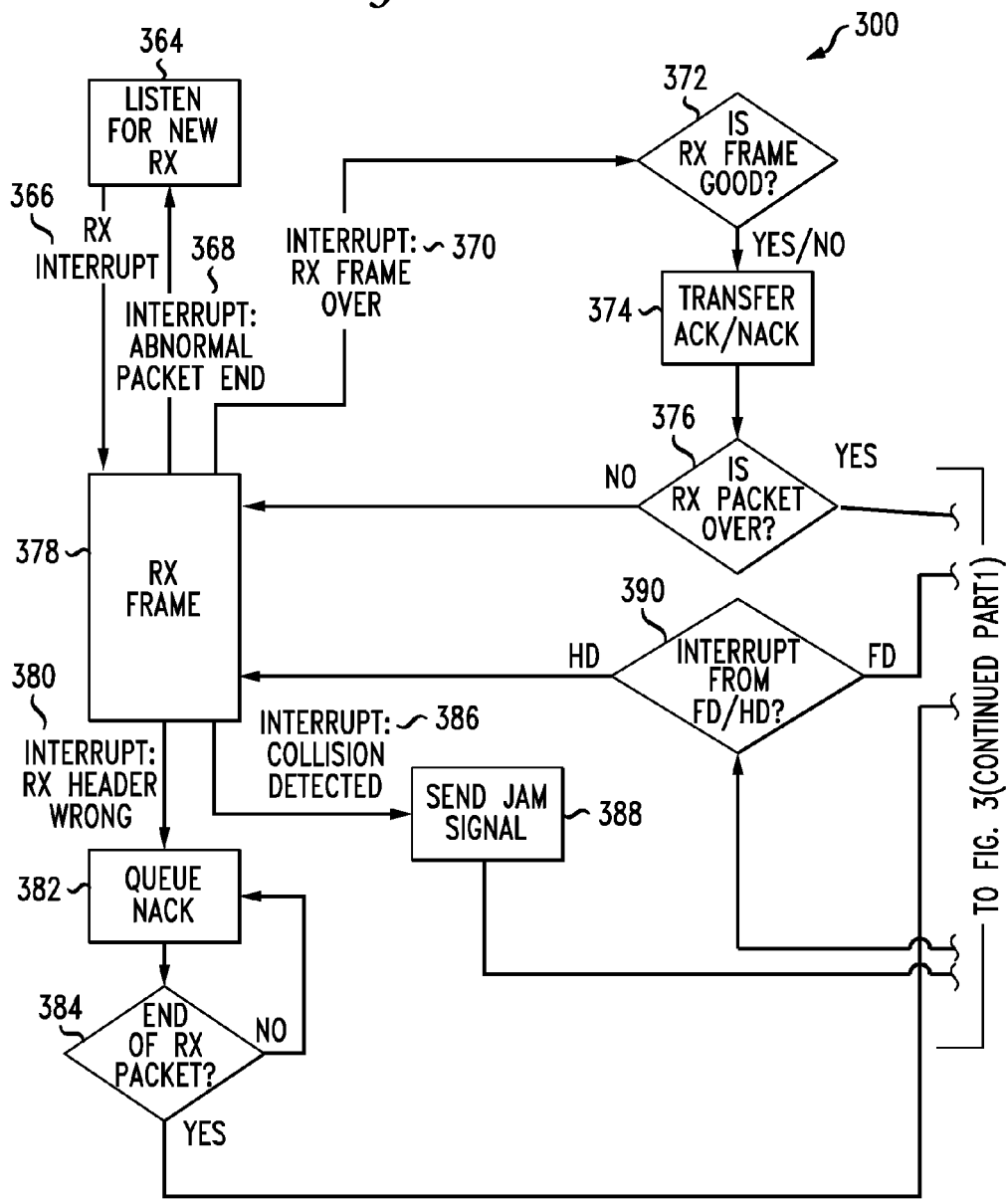
FIG. 3 illustrates an example of a MAC protocol where nodes are both full duplex and half duplex.

FIG. 3 illustrates an example of an improved MAC protocol 300 for full duplex nodes communicating both with other full duplex nodes and with half duplex nodes. For simplicity in illustration, those elements of the protocol 300 concerned with full duplex communications which were described with respect to FIG. 2 retain the numbering seen in FIG. 2. In the illustrated configuration, when the protocol is idling ('TX and RX Idle' 202) and the node receives an interrupt, the protocol first determines if the client node communicates via full duplex or half duplex ('Interrupt from FD/HD?' 390). If the client communicates via full duplex, the protocol returns to the full duplex states disclosed in FIG. 2, beginning with 'RX and FD-TX (RR)' 218. If, however, the client communicates via half duplex, the protocol instead moves to a receive only state ('RX Frame' 378), with no ongoing transmissions.

From this receive state 378, if a collision is detected 386, the node can queue and transmit a jam signal ('Send Jam Signal' 388), then return to the idle state 202. If, in the receive state 378, an interrupt indicating an incorrect header 380 is received, the node can queue a NACK ('Queue NACK' 382), and upon determining that the received packet is received ('End of RX packet?' 384), transmit the NACK ('TX frame (FR)' 206).

Should the protocol, while in the receive state 378, detect an abnormal packet end 368, the protocol waits for additional data ('Listen for new RX' 364), which is identified by an 'RX Interrupt' 266. Alternatively, should the protocol, while in the receive state 378, detect that the frame is over 370, the protocol determines if the received frame is good ('Is RX Frame Good?' 372), then sends a corresponding ACK or NACK ('Transfer ACK/NACK' 374). At that point, the protocol determines if the received packet is complete ('Is RX packet over?' 376). If so, the protocol can return to the full duplex states ('RX and FD-TX (RR)' 218). Otherwise it can continue to receive only ('RX Frame' 378).

Figure 4:
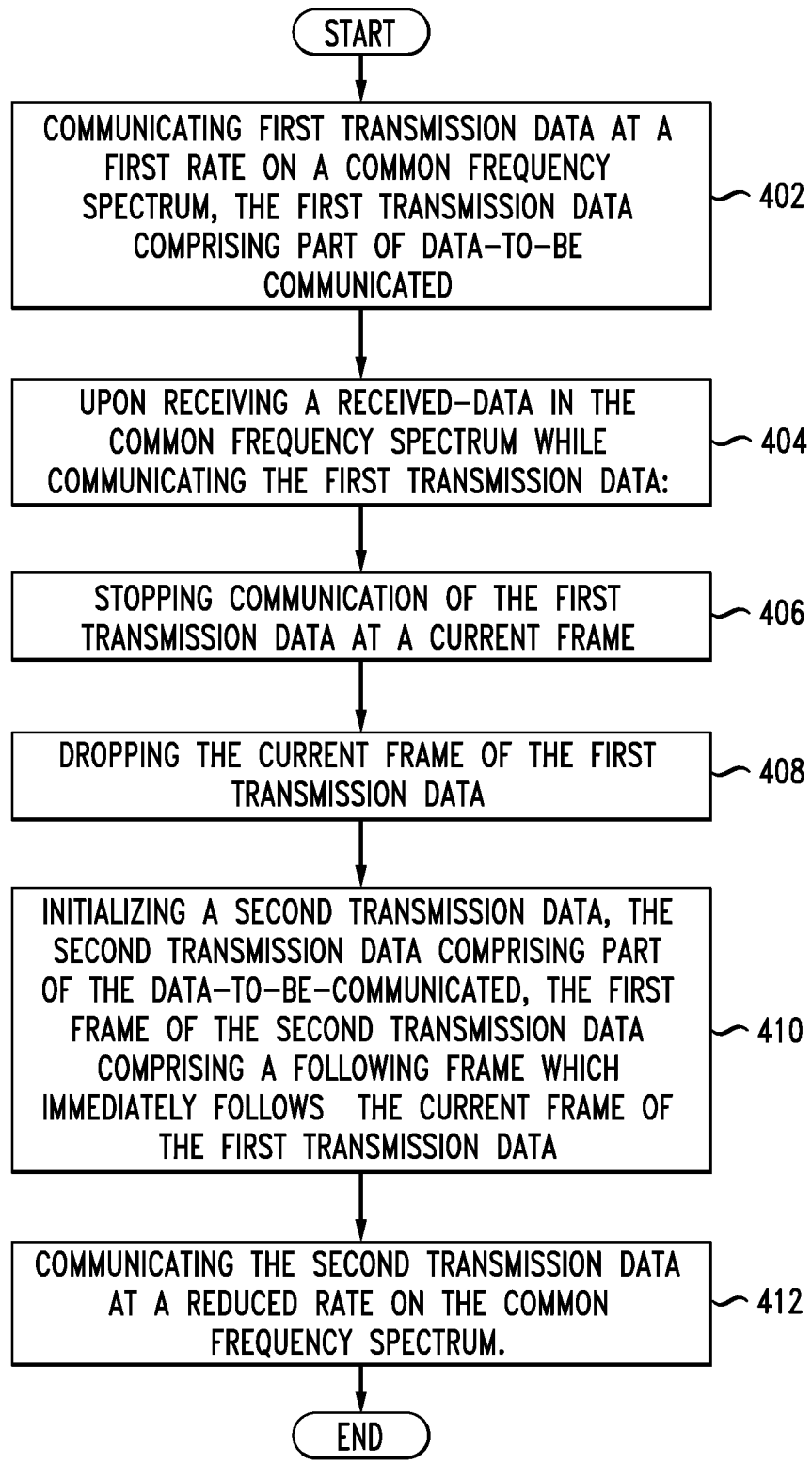
FIG. 4 illustrates an example method embodiment.

Having disclosed some basic system components and concepts, the disclosure now turns to the exemplary method embodiment shown in FIG. 4. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

For example, a system 100 configured to practice a method according to this disclosure can utilize the protocol illustrated in FIG. 2 when communicating only with full-duplex systems, and utilize the protocol of FIG. 3 when communicating with both half and full-duplex. This system 100 communicates first transmission data at a first rate on a common frequency spectrum, the first transmission data comprising part of data-to-be communicated (402). The system 100, upon receiving received-data in the common frequency spectrum while communicating the first transmission data (404), stops communication of the first transmission data at a current frame (406). The system 100 then drops the current frame of the first transmission data (408), then initializes a second transmission data, the second transmission data comprising part of the data-to-be-communicated, the first frame of the second transmission data comprising a following frame which immediately follows the current frame of the first transmission data (410). The first transmission data can be communicated in a first communication format while the received-data can be received in a second communication format which is not the same as the first communication format. For example, one of the first transmission data and the received-data can be communicated in a full duplex format, while the other is communicated in a half duplex format. Alternatively, both the communications made and received can be in a full duplex format. Finally, the system 100 communicates the second transmission data at a reduced rate on the common frequency spectrum.

In addition, the system 100 can prepare self-interference cancellation while communicating the first transmission data, and then apply that self-interference cancellation when receiving the received-data. By preparing self-interference cancellation based on transmissions and previously estimated passive suppression, the system 100 can avoid signaling the actual interference received at any given moment, thereby providing improved cancellation capabilities by utilizing fewer resources.

When the system 100 drops the current frame upon stopping communication, the system 100 can later retransmit the dropped frame or, alternatively, cannot retransmit the dropped frame. In addition, the system 100 can, upon detecting a collision, stop communication of the first transmission data and the second transmission data, instead communicating a jam signal. The jam signal can then be communicated to multiple nodes, even if those nodes are hidden to one another. This in turn can cause all full duplex clients in communication with the node to stop any transmission. Because WLAN have, prior to full duplex, always been half duplex communication, they used CSMA/CA (collision avoidance) rather than CSMA/CD (collision detection). The change from collision avoidance rather than collision detection will result in improved communication capabilities, and is captured, at least in part, in FIG. 4.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as described above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied cellphone communications, satellite communications, and both line-of-sight and non-line-of-sight communications. Those skilled in the art will readily recognize various modifications and changes that may be made to the principles described herein without following the example embodiments and applications illustrated and described herein, and without departing from the spirit and scope of the disclosure.

We claim:

1. A method comprising:
   communicating first transmission data at a first rate on a common frequency spectrum, the first transmission data comprising part of data-to-be-communicated; and
   upon receiving a received-data in the common frequency spectrum while communicating the first transmission data:
      stopping communication of the first transmission data at a current frame;
      dropping the current frame of the first transmission data;
      initializing a second transmission data, the second transmission data comprising part of the data-to-be-communicated, a first frame of the second transmission data comprising a following frame which immediately follows the current frame of the first transmission data; and
      communicating the second transmission data at a reduced rate on the common frequency spectrum.

2. The method of claim 1, wherein the first transmission data is communicated in a first communication format and the received-data is received in a second communication format which is dissimilar to the first communication format.

3. The method of claim 2, wherein the first communication format and the second communication format comprise full duplex communications and half duplex communications.

4. The method of claim 1, wherein the first transmission data is communicated in a full duplex format and the received-data is received in the full duplex format.

5. The method of claim 1, further comprising:
   preparing self-interference cancellation while communicating the first transmission data; and
   applying the self-interference cancellation only when receiving the received-data.

6. The method of claim 1, wherein the current frame is not retransmitted after dropping the current frame.

7. The method of claim 1, further comprising:
   upon detecting a collision, stopping communication of the first transmission data and the second transmission data; and
   communicating a jam signal.

8. The method of claim 7, wherein communicating the jam signal is received by a plurality of full duplex clients.

9. A system, comprising:
   a processor; and
   a computer-readable storage device storing instructions which, when executed by
   the processor, cause the processor to perform operations comprising:
      communicating first transmission data at a first rate on a common frequency spectrum, the first transmission data comprising part of data-to-be-communicated; and upon receiving a received-data in the common frequency spectrum while communicating the first transmission data:
stopping communication of the first transmission data at a current frame;
dropping the current frame of the first transmission data;
initializing a second transmission data, the second transmission data comprising part of the data-to-be-communicated, a first frame of the second transmission data comprising a following frame which immediately follows the current frame of the first transmission data; and
communicating the second transmission data at a reduced rate on the common frequency spectrum.

10. The system of claim 9, wherein the first transmission data is communicated in a first communication format and the received-data is received in a second communication format which is dissimilar to the first communication format.

11. The system of claim 10, wherein the first communication format and the second communication format comprise full duplex communications and half duplex communications.

12. The system of claim 9, wherein the first transmission data is communicated in a full duplex format and the received-data is received in the full duplex format.

13. The system of claim 9, the computer-readable storage device storing additional instructions which, when executed by the processor, cause the processor to perform operations comprising:
preparing self-interference cancellation while communicating the first transmission data; and
applying the self-interference cancellation only when receiving the received-data.

14. The system of claim 9, wherein the current frame is not retransmitted after dropping the current frame.

15. The system of claim 9, the computer-readable storage device storing additional instructions which, when executed by the processor, cause the processor to perform operations comprising:
upon detecting a collision, stopping communication of the first transmission data and the second transmission data; and
communicating a jam signal.

16. The system of claim 15, wherein communicating the jam signal is received by a plurality of full duplex clients.

17. A computer-readable storage device storing instructions which, when executed on a processor, cause the processor to perform operations comprising:
communicating first transmission data at a first rate on a common frequency spectrum, the first transmission data comprising part of data-to-be-communicated; and
upon receiving a received-data in the common frequency spectrum while communicating the first transmission data:
stopping communication of the first transmission data at a current frame;
dropping the current frame of the first transmission data;
initializing a second transmission data, the second transmission data comprising part of the data-to-be-communicated, a first frame of the second transmission data comprising a following frame which immediately follows the current frame of the first transmission data; and
communicating the second transmission data at a reduced rate on the common frequency spectrum.

18. The computer-readable storage device of claim 17, wherein the first transmission data is communicated in a first communication format and the received-data is received in a second communication format which is dissimilar to the first communication format.

19. The computer-readable storage device of claim 18, wherein the first communication format and the second communication format comprise full duplex communications and half duplex communications.

20. The computer-readable storage device of claim 17, wherein the first transmission data is communicated in a full duplex format and the received-data is received in the full duplex format.

* * * * *